June 2, 1959    R. E. BELL ET AL    2,889,546
ELECTRONIC COUNTER READOUT DEVICE
Filed May 21, 1954    3 Sheets—Sheet 1
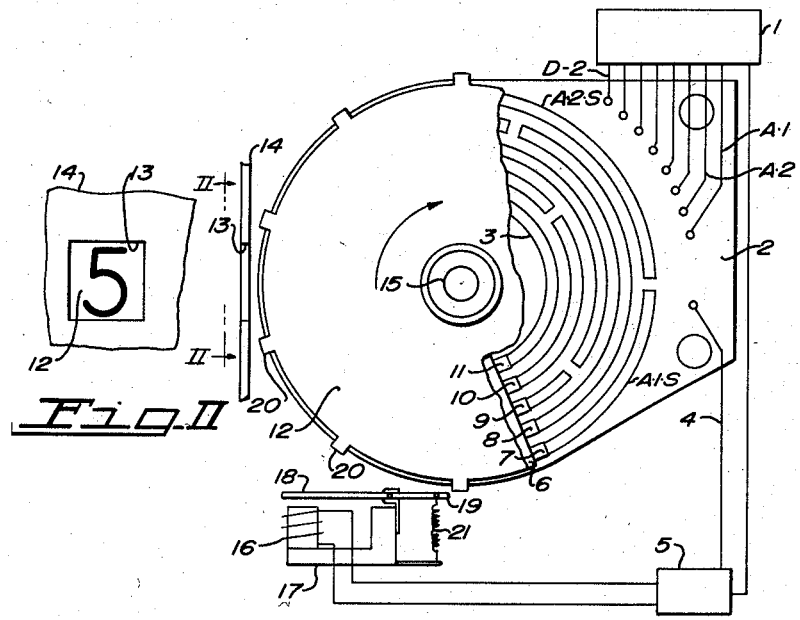
Fig. I
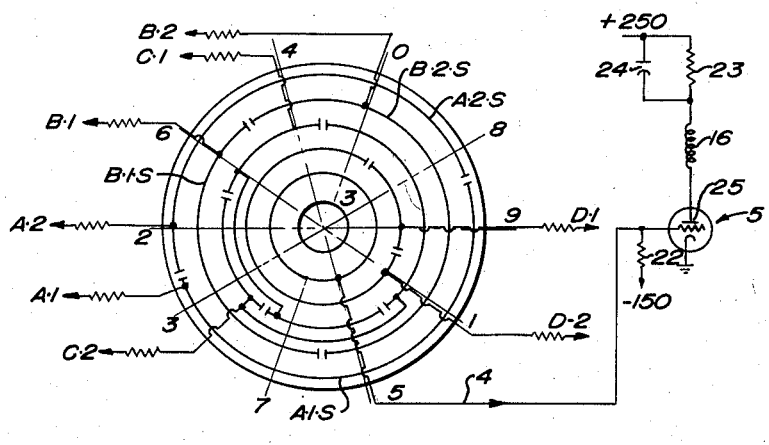
Fig. III
INVENTORS
CLARENCE S. SIMONDS
ROBERT E. BELL
BY
Marshall, Marshall & Yeasting
ATTORNEYS

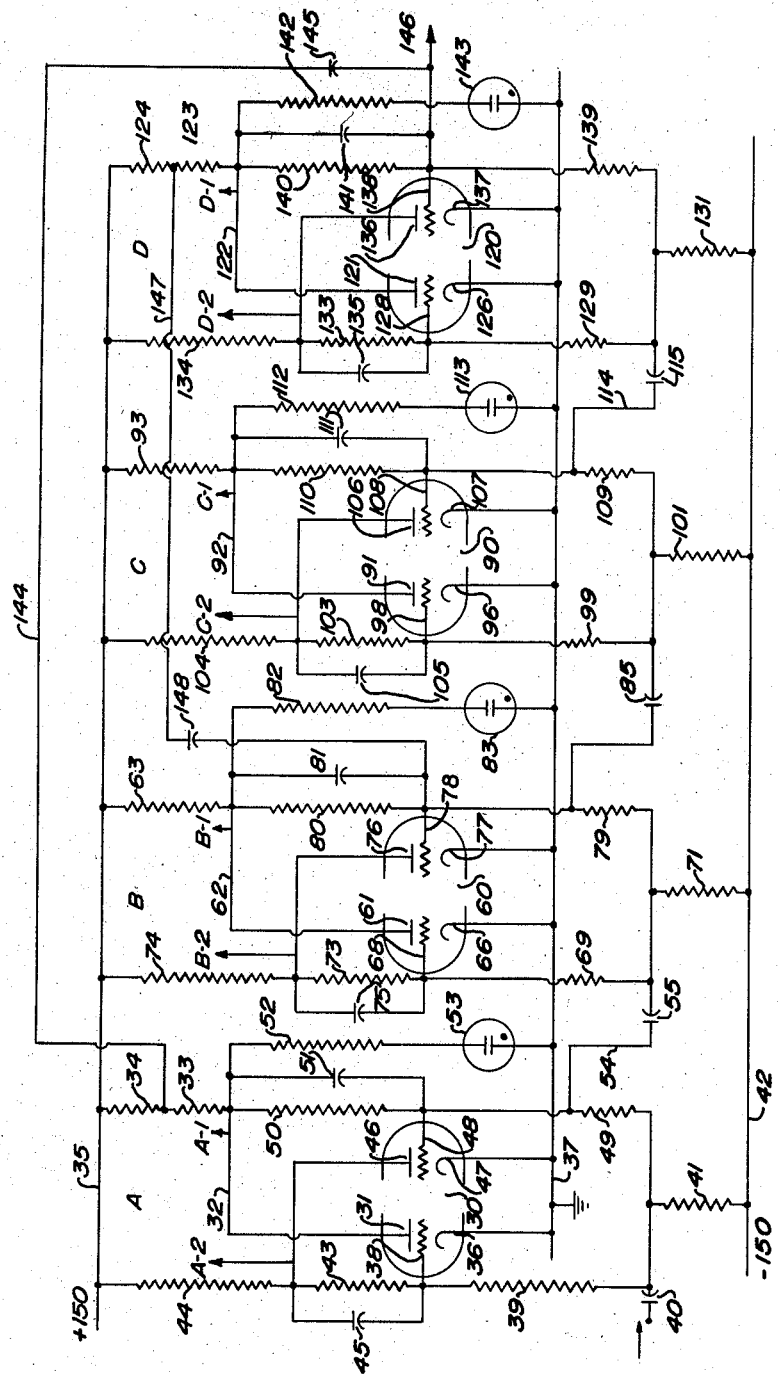

June 2, 1959  R. E. BELL ET AL  2,889,546
ELECTRONIC COUNTER READOUT DEVICE
Filed May 21, 1954  3 Sheets-Sheet 3
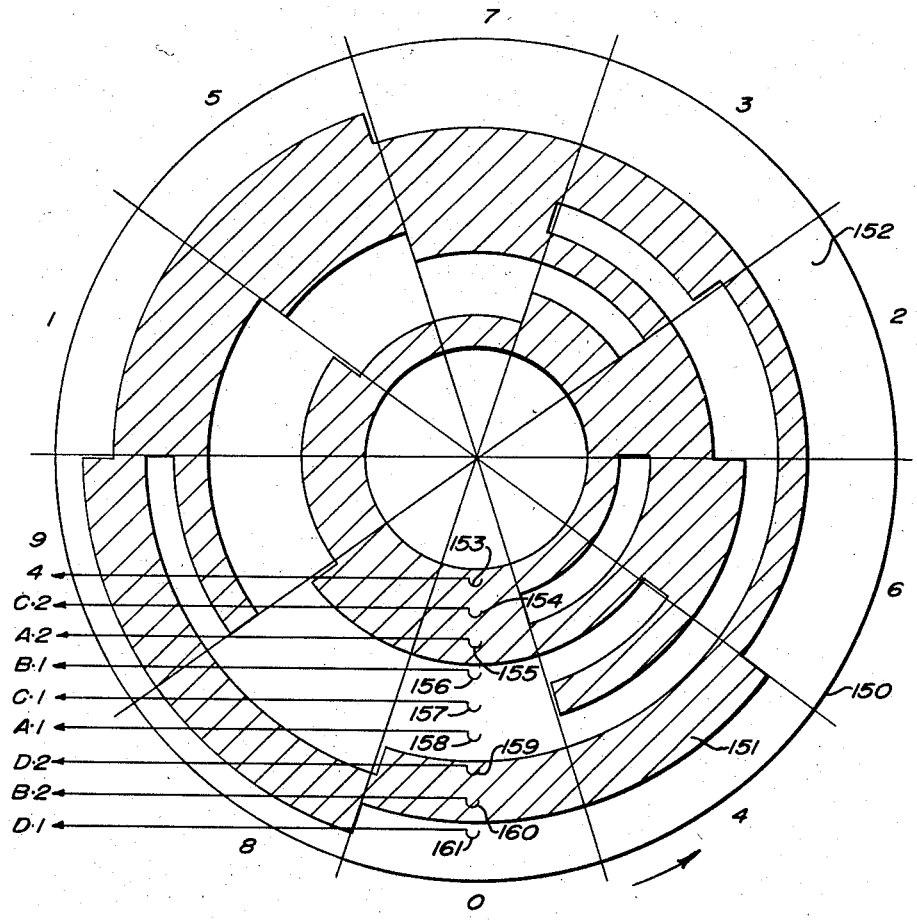
Fig. V
INVENTORS
CLARENCE S. SIMONDS
ROBERT E. BELL
BY
ATTORNEYS

United States Patent Office 2,889,546
Patented June 2, 1959

2,889,546

ELECTRONIC COUNTER READOUT DEVICE

Robert E. Bell and Clarence S. Simonds, Toledo, Ohio, assignors, by mesne assignments, to Toledo Scale Corporation, Toledo, Ohio, a corporation of Ohio Application May 21, 1954, Serial No. 431,554

5 Claims. (Cl. 340—316)

This invention relates to an indicating apparatus and in particular to means for indicating in easily readable figures the count accumulated in one decade of an electronic counter. By suitably duplicating the equipment indications from several decades of a counter may be displayed.

Electronic counters are widely used for counting phenomena that occur at rates much higher than any rates that a mechanical counter can follow. One disadvantage of electronic counters as compared to mechanical counters is the fact that the indications thereof are not readily displayable in plain figures for ease of reading by untrained persons. For example, ordinary electronic counter operating on the binary system of notation displays its count by a system of neon lights, four for each decade. In the usual arrangement the decimal count is found by adding the values represented by each of four lights where the first indicates a one; the second indicates two; the combination of the first two indicates three; the third indicates four; and the fourth indicates eight. A count of nine is indicated by lighting the first and fourth bulbs, while a count of seven is indicated by lighting the first, second, and third bulbs. This type of indication is difficult to interpret by ordinary personnel and those not regularly using the equipment. It is therefore desirable where the indication of an electronic counter is to be displayed and utilized by ordinary personnel that the count be indicated in plain aligned figures. It has been proposed to provide such plain figure indication by using a stepping switch or its equivalent to sequentially sample or test a series of leads to find the lead or contact terminal having a distinctive potential indicative of the count then accumulated in the electronic counter. The control for the stepping switch or its equivalent is arranged to stop the switch when its sensing element finds the distinctive potential. Indicia marked on a drum or other chart driven by the stepping switch then indicates the count in the counter. This equipment is usually arranged so that, should the count change, the counter drive, the stepping switch or its equivalent, is immediately put into operation and runs until the switch again finds the distinctive potential lead.

A stepping switch for this purpose may consist of a ratchet wheel operated by a solenoid that is successively operated until the sensing element finds the proper lead. Alternatively, a continuously operating friction drive may be employed to turn the selector switch and a magnetically controlled latch cooperating with a notched wheel may be used to stop the indicating wheel and switch when its sensing element finds the proper terminal. The latter method provides smooth or uniform rotation of the indicating drum and switch until the proper terminal is sensed and then a quick stop. The ratchet or stepping relay type steps forward a step at a time and may be quite noisy in operation although it is capable of arriving at the correct indication quite quickly.

When, as shown in U.S. Patent No. 2,591,007, this type of indicating equipment is used with the ordinary binary type of electronic counter, a matrix or its equivalent is necessary to convert the binary count into signals representing each of the ten conditions for a given decade. While this matrix may consist or be made up of entirely ordinary resistors it is necessary that they be properly selected as to resistance values and the number becomes quite large. Thus the ordinary matrix may require from thirty to forty resistors.

The principal object of this invention is to provide a simple commutator that is adapted to resolve the indications of a binary type counter into signals effective to control a stepping relay or equivalent indicating device.

Another object of the invention is to provide a simple commutator having a minimum number of segments that is adapted to resolve, without the use of resistor networks or complicated circuits, the count of an electronic counter and control mechanism according to such count.

Another object of the invention is to provide a commutator for an electronic counter so arranged that, as the sensing element moves from position to position, only one contact element is changed for each change in position.

Another object of the invention is to provide a commutator element having electrically connected portions cooperating with a set of brushes for resolving a binary indication.

A still further object of the invention is to provide a commutator assembly that may be manufactured by printing processes.

These and more specific objects and advantages are obtained from commutators constructed according to the invention.

In one embodiment of the invention the commutator is formed with five distinct circular tracks or rings of contacts that cooperate with a multileaf brush carried by the moving element of the indicating mechanism. A first one of the tracks of the commutator is a continuous slip ring that is connected to the output circuit of the commutator. The other four tracks are each composed of two or more segments that are connected to the various stages of a binary electronic counter.

The commutator segments or contacts for the complete set of four stages of electronic counter include ten such contacts. The contacts or segments are arranged in the four tracks so that each of three of the tracks contains two segments each thus making six segments for the three tracks while the remaining track contains four segments. The joints between the segments in the various tracks are staggered so as to occur at 1/10 revolution intervals around the circle. The multileaf brush carried on the moving part of the indicating assembly has five leaves or fingers that cooperate with the four tracks and serves to connect them with each other and with the common output slip ring. The impedances of the circuits from the electronic counter to the slip ring are adjusted so that the indicating mechanism is stopped when four active signals are received and sensed by the commutator. Three such signals are insufficient to stop the commutator. Each combination of four signals that may be received from a four stage binary counter capable of counting to ten will when the commutator reaches the proper position provide a distinctive potential at the output of the commutator, which distinctive potential is suitable for use in controlling the stopping of the moving part of the mechanism.

In a second form of the invention the commutator, a continuous piece with insulated portions, is carried on the rotating member and cooperates with a set of nine radially aligned brushes, two for each stage of the binary counter and one for a common output lead.

Preferred embodiments of the invention are illustrated in the accompanying drawings.

In the drawings:

Figure I is a side elevation with parts broken away showing a portion of the indicating drum and its stops together with the brushes and commutator that are used in the circuits controlling the indication of a count.

Figure II is a fragmentary front elevation of the improved indicating device.

Figure III is a diagram of the commutator showing the connection of the various segments.

Figure IV is a schematic wiring diagram of one decade of an electronic counter suitable for use with the indicating mechanism shown in Figures I and III.

Figure V is a diagram of a second form of commutator and brushes.

These specific figures and the accompanying description are intended merely to illustrate the invention but not to impose limitations on its scope.

Referring now to Figure I information relative to a count accumulated in a binary system electronic counter 1 is transmitted through a series of leads A1, A2; B1, B2; C1, C2; and D1, D2 that connect various stages of the electronic counter to commutator segments A1S, A2S, etc. The commutator segments are arranged as concentric rings on an insulated mounting piece 2. A slip ring 3 located radially within and concentric with the commutator segments provides an output connection from the commutator. This slip ring 3 is connected through a lead 4 to an amplifier 5.

A brush 6 having leaves 7, 8, 9, 10, and 11 is mounted on a side of a drum 12 bearing, on its periphery, indicia to be indicated. The indicia are visible through a window 13 in a front wall 14 of a housing enclosing the device.

The indicia bearing drum 12 is frictionally driven by means of a friction clutch, not shown, one part of which is permanently attached to a continuous driven shaft 15 journaling all the rotating elements of the indicating device. The slipping clutch and the continuously driven shaft 15 are arranged to drive the indicating drum clockwise as is indicated by the arrow in Figure I.

When in the course of a revolution of the indicating drum all of the leaves 7, 8, 9, 10 of the brush 6 contact energized segments of the commutator sufficient voltage is applied to the slip ring 3 and through the lead 4 to the amplifier 5 to energize a coil 16 of a stopping relay 17 and attract its armature 18, a tail end 19 of the armature then moves into the path of stops 20 protruding from the periphery of the indicating drum 12. As long as the brush 6 has its leaves 7 to 10 inclusive bearing on energized segments of the commutator the coil 16 is energized and the armature 18 is engaged with one of the stops to prevent rotation of the indicating drum. Should the count in the counter change to a new count so that all of the segments then contacted are no longer energized the coil 16 is de-energized and a return spring 21 retracts the tail end of the armature 19 from engagement with the engaged stop 20 thereby permitting the indicating drum to move. The drum then rotates until the brushes find the next combination of energized segments that provides full energization of the slip ring 3.

The arrangement of connections to the various commutator segments is indicated in Figure III. As shown in this figure the outside row or ring of segments includes two segments connected to the leads A1 and A2 respectively. Each of these segments extends half way around the circumference of the commutator. The segment A2S, connected to the lead A2, extends from the number two position at the left but not including a diametrically opposite position. This segment is energized as long as the count in the counter is even, i.e.: is 0, 2, 4, 6, or 8. The lead A1 is connected to the other half A1S of the first commutator which extends from the 9 position through positions 1, 5, 7 and 3. For the purpose of controlling the voltage supplied to the commutator segments resistors of equal value are included in series in each of the leads.

The second ring of commutator segments includes segment B1S connected to lead B1 and B2S connected to lead B2 and together extend completely around the commutator. The segment B1S extends from the 7 position at the lower left clockwise to the 6 position at the upper left. The complementary segment B2S extends from the 4 position at the upper left clockwise around to the 5 position at the lower right.

The third ring of the commutator includes four segments two of which are connected in parallel to the lead C1 and the other two of which are connected in parallel to the lead C2.

The remaining ring of segments consists of two segments one, connected to lead D2, and extending from the one position clockwise through the 0 position while the other, connected to lead D1, is of short length extending positions 8 and 9 only.

Each of the leads A1 to D2 is considered to be energized if it carries a positive potential from the electronic counter. When four such leads are energized the current flow through the corresponding resistors to lead 4 is sufficient, when flowing through a grid resistor 22 of the amplifier 5, to decrease the grid voltage of the amplifier 5 sufficiently to permit current conduction through the tube. The plate circuit of the amplifier 5 is connected to a positive 250 volts supply and includes a parallel combination of a resistor 23 and condenser 24 in series with the relay coil 16 of the stopping relay 17.

The parallel resistor and condenser combination in series with the coil 16 allows a surge of current to flow when the tube first conducts and then decreases the current flow to that which may safely flow continuously in the coil 16. This provides a larger force to pull in the armature 18 of the relay and then reduces the force to that required to hold the armature 18.

In this arrangement of the commutator segments, the leads A1 and A2 are connected to a first stage of a binary counter so that these leads are alternately energized as the count proceeds. Thus the lead A1 is energized as long as the count is odd, that is, for the numbers 1, 3, 5, 7 and 9 while the lead A2 is energized for the remaining counts, the even counts.

Leads B1 and B2 are connected to the second stage of the counter, the lead B1 being energized when the count is 2, 3, 6, or 7 while B2 is energized for the remaining counts.

Leads C1 and C2 are connected to the third stage of the counter, lead C1 being energized when the count is 4, 5, 6 or 7 while C2 is energized for the remaining counts.

Leads D1 and D2 are connected to the last stage, lead D1 being energized for counts 0 to 7 inclusive while D2 is energized for counts 8 and 9.

An electronic counter of the binary type suitable for energizing the commutator shown in Figures I, II and III is illustrated schematically in Figure IV. Such a counter comprises four stages A, B, C and D. These stages are substantially identical and each comprises a bi-stable multi-vibrator circuit that may be switched from one condition of stability to another and back again by a succession of input pulses.

The first stage, stage A, comprises a dual triode tube 30 having a first plate 31 connected through a lead 32 and resistors 33 and 34 to a B+ line 35 maintained at about 150 volts positive with respect to a grounded lead 37. A cathode 36 cooperating with the plate 31 is connected directly to a grounded lead 37. A grid 38 cooperating with the cathode 36 and plate 31 is connected through a resistor 39 to an input condenser 40 and also through the resistor 39 and a second resistor 41 to a negative return lead 42 maintained at approximately 150 volts negative with respect to the grounded lead 37. The grid 38 is also connected through a grid to plate resistor 43 and a plate resistor 44 to the B+ lead 35. The resistor 43 is by-passed with a small condenser 45. The junction between the resistors 43 and 44 is connected directly to a plate 46 of the second half of the dual triode 30. This plate cooperates with a cathode 47 connected directly to the grounded lead 37. A grid 48 cooperating with the cathode 47 and plate 46 is connected through a grid return resistor 49 to the input condenser 40 and through the return resistor 41 to the negative return lead 42. Furthermore the grid 48 is connected through a grid to plate resistor 50 to the plate resistors 33 and 34 and, through the lead 32, to plate 31. The resistor 50 is by-passed with a condenser 51.

This circuit is symmetrical side for side in that the plate resistors 33 and 34 cooperating with a plate 31 are identical in total resistance value to the plate resistor 44 connected to the second plate 46. Likewise the grid return circuits including the resistors 39 and 49 are identical and have the common return resistor 41. The plate to grid resistors 43 and 50 are identical as well as the condensers 45 and 51. In order to provide a visible indication of the condition of this circuit the lead 32 is connected through a resistor 52 and neon bulb 53 to the grounded return lead 37. The bulb 53 will glow as long as current is flowing through the plate 46 and cathode 47 which occurs as long as the first half of the tube including the plate 31 is at current cutoff. Typical resistance values for the resistors 44 and the combination 33,34 is 40,000 ohms for each plate circuit. The plate to grid resistors may be of the order of 100,00 ohms each, the grid to common resistors 39 and 49 may be approximately 50,000 ohms each, and the common to negative return lead resistor 41 should be in the order of 100,000 ohms. The condensers 40, 45 and 41 may be made of the order of 300 micro-microfarads.

When the apparatus is first turned on neither section of the dual triode 30 is conducting current and each of the grids 38 and 48 tends to assume a potential somewhat positive with respect to the grounded lead 37. Therefore each side of the triode immediately begins to conduct the current thereby increasing the voltage drop through the resistors 33, 34 and the resistor 44. As the plate potentials drop in response to this current flow the grids 38 and 48 are each driven negative thereby tending to cutoff the current flow through each half of the tube. Because of unavoidable differences in filament heating time, tube conductivity, and resistance values one grid will cutoff its current flow more rapidly than the other and the circuit will stabilize itself with one half of the dual triode conducting current and the other half completely cutoff.

Suppose that the left half of the tube, that is the plate 31, be conducting current. The potential of the lead 32 is positive with respect to the grounded lead 37 by the voltage drop across the conducting portion of the tube. The potential of the lead A2 connected to the plate 46 however will be much more positive because the second half of the tube including the plate 46 is at current cutoff. Likewise the grid 48 is negative with respect to its cathode 47 while the grid 38 is slightly positive with respect to the cathode 36 and some grid current flows from the grid 38 to the cathode 36. The condenser 45 is charged to slightly more than 100 volts while the condenser 51 is charged to a voltage of the order of 20 to 40 volts. If, while the tube is operating in this condition, a negative pulse be applied to the input condenser 40 so as to drive the junction between the resistors 39 and 41 negative the grids 38 and 48 are both driven negative thereby completely cutting off current flow through both halves of the dual triode 30. Upon the decay or passage of the pulse as the grids 38 and 48 tend to become positive the grid 48 leads in this change because of the small voltage charge on the condenser 51 as compared to the charge on the condenser 45. Therefore the second half of the triode, i.e., the plate 46 and cathode 47 will draw plate current rather than the first half including the plate 31. Plate current flow through the second half, by flowing through the resistor 44, prevents the grid 38 from becoming sufficiently positive to allow any current flow through the first half of the tube. Therefore the stage stabilizes after the pulse with the second half conducting and the first half cutoff. In this condition voltage of the plate 31, lead 32 and the lead A1 leading to the commutator, is sufficiently positive to illuminate the neon light 53 and provide the positive voltage required for operation of the commutator.

The next negative pulse supplied through the input condenser 40 reverses the state of conduction of the triode 30 with the first half including the plate 31 drawing current so as to extinguish the neon bulb 53, reduce the voltage on the lead A1, and raise the voltage on the lead A2. When the first half of the triode 30 starts to draw plate current upon the decay of the second input pulse the plate voltage and the potential of the lead 32 drop sharply. This produces a sharp negative voltage pulse at the grid 48 which is transmitted through a lead 54 and and a condenser 55 serving as the input condenser for the second stage B.

The second stage includes a dual triode 60 having a first plate 61 connected through a lead 62 to a resistor 63 which is connected directly to the B+ lead 35. A cathode 66 cooperates with the plate 61. This cathode is connected directly to the grounded lead 37. A grid 68 cooperating with the plate 61 and cathode 66 is connected through a resistor 69 to the input condenser 55 and to a resistor 71 which is connected to the negative return lead 42. A plate to grid resistor 73 corresponding to the resistor 43 connects the grid 68 to a plate resistor 74 and to a plate 76 of the second half of the dual triode 60. The plate 76 cooperates with a cathode 77 and grid 78. The cathode 77 is connected to the grounded lead 37 while the grid 78 is connected through a resistor 79 to the input condenser 55 and resistor 71 and through a second resistor 80 to the lead 62 and plate resistor 63 of the first half of the dual triode 60. Condensers 75 and 81 corresponding to the condensers 45 and 51 by-pass the plate to grid resistors 73 and 80. The condition of conduction in this second stage is indicated by current flow through a resistor 82 and a neon light 83.

Output pulses from the second stage B of the counter are transmitted through a small condenser 85 to the input circuit of the third stage C of the counter. This stage is similar to the preceding stages and includes a dual triode 90 corresponding to the triodes 30 and 60. This stage includes the first half plate 91 that is connected through a lead 92 and plate resistor 93 to the B+ lead 35. A cathode 96 cooperating with a plate 91 is connected to the grounded lead 37 while a grid 98 cooperating with the plate 91 and the cathode 96 is connected through a grid resistor 99 to the input condenser 85 and through a resistor 101 to the negative return lead 42. Likewise, the grid 98 is connected through a grid to plate resistor 103, corresponding to the resistors 43 and 73, to a plate resistor 104 connected to the B+ lead 35. A condenser 105 by-passes the grid to plate resistor 103. The junction between the resistors 103 and 104 is connected to a second plate 106 of the triode which cooperates with a cathode 107 and grid 108. The grid 108 is connected through the grid resistor 109 to the input condenser 85 and the resistor 101 connected to the negative return lead 42. The grid 108 is also connected through a grid to plate resistor 110 to the plate resistor 93 of the first half of the dual triode. A condenser 111 is connected in parallel with the grid to plate resistor 110. The state of conduction of this stage is indicated by current flow through a resistor 112 and neon lamp 113. Output pulses from stage C are taken from the grid connection between the resistors 109 and 110 through a lead 114 and output condenser 115.

The fourth stage D is similar to the others and includes a dual triode 120 having a first plate 121 that is connected through a lead 122 to series plate resistors 123 and 124 the latter being connected to the B+ lead 35. A cathode 126 cooperating with a plate 121 is connected directly to the grounded lead 37. A grid 128 cooperating with the cathode 126 is connected through a grid resistor 129 to the input condenser 115 and a return resistor 131 connected to the negative return lead 42. The grid 128 is also connected through a grid to plate resistor 133 and plate resistor 134 to the B+ lead 35. The resistor 133 is by-passed by a condenser 135. A plate 136 of the second half of the dual triode 120 is connected to the junction between the resistors 133 and 134. This plate 136 cooperates with a cathode 137 and a grid 138. The grid 138 is connected to the input condenser 115 by a grid resistor 139 and is connected to the plate 121 through a resistor 140 and parallel connected condenser 141. These resistors and condensers are similar to those used in the preceding stages and the state of conduction of this stage is indicated by current flow through a resistor 142 and neon bulb 143.

If nothing more were added to the circuit the first stage A would reverse its state of conduction at every pulse, the second stage B would reverse its state of conduction at every second pulse. Likewise, the third stage C would reverse on every fourth pulse while the last stage D would reverse on every eighth pulse. Thus for four stages sixteen pulses complete the sequence and leave the states of conduction in exactly the same condition as at the start of the sequence. In order that the counter may be used in a decimal system in conjunction with other decades, that is, give an output pulse for every tenth input pulse and reset to zero on each tenth impulse certain cross connections are employed. Thus a junction between the plate resistors 33 and 34 of stage A is connected through a lead 144 and condenser 145 to the grid 138 of the fourth stage. The condenser 145 is preferably made about ⅙ the capacity of the condensers 45, 51, 75, 85 etc. This circuit through the condenser 145 supplies a small negative pulse each time the first stage A transfers conduction from its second half to its first half, i.e., when it transfers from an even count to an odd count. During the first eight counts assuming that the counter was initially in the condition with each of the left halves of the tubes conducting the negative pulses applied to the condenser 145 have no effect because the grid 138 is already negative because of the current flow through the first half of the tube 120 and the plate resistors 123 and 124. Following the eighth pulse when stages A, B and C return to their original condition stage D is left with the second half conducting, i.e., with current flow through the plate 136 and cathode 137. Under this condition grid 138 is slightly positive with respect to its cathode. The ninth pulse applied to the input condenser 40 causes the first stage A to reverse its condition. The tenth pulse applied to the input condenser 40 again reverse the first stage A and in so doing causes the application of a negative pulse through the lead 144 condenser 145 to momentarily drive the grid 138 negative with respect to its cathode 137. As the grid 138 is driven negative and cuts off current flow through the plate 136, an amplified impulse appears at the junction between the resistors 133 and 134 in a positive direction tending to allow the first half of the tube 120 to draw current. As this current flow increases the grid 138 is driven further negative as in an ordinary transfer to provide an output pulse on lead 146 connected to a succeeding decade. Thus stage D is returned to its original position on the first even pulse applied to the input condenser 40 of stage A following the eight previous pulses. The tenth pulse simultaneously with operating stage D also applied a negative impulse through input condenser 55 to the second stage B to cause it to transfer to its second half conducting condition. This stage is reset to its original condition by current flow through a lead 147 connected to the junction between the plate resistors 123 and 124 of stage D and a condenser 148 connected directly to the grid 78 of stage B. The condenser 148 is preferably half the capacity of the condensers 81 or 85 and serves to drive the grid 78 negative during the stabilization of stage B following the input pulse through condenser 55 so that stage B instead of remaining in its second condition with the second half conducting returns immediately to its first condition with the plate 61 conducting current. Thus the four stages return to zero indication.

While the method of resetting a counter to zero is not important insofar as this invention is concerned there may be cases where it may be desirable to reset the counter prior to any particular event. This resetting may be easily accomplished either by opening the cathode circuit to the second half of each of the stages, that is, the circuit to the cathodes 47, 77, 107 and 137, or by simultaneously applying a short negative pulse to the grids 48, 78, 108 and 138. While the resetting impulse should be of short duration it must nevertheless be somewhat longer than the impulses transmitted through the input condensers 40, 55, 85 and 115, of each of the stages.

When this counter decade is in a condition to indicate zero all of the neon bulbs 53, 83, 113 and 143 are extinguished thus indicating that leads A2, B2, C2 and D2 are at their maximum positive potentials. In this event when the commutator arrives at a position where it connects these four leads together a maximum positive potential is applied to the grid of the amplifier tube 5 so as to energize the coil 16 and stop the drum 12. Other counts are indicated by corresponding combinations of voltages on the leads A1, A2, B1, B2, etc.

The following table shows the counter condition and the voltage fed to the amplifier for each digit to be indicated (state of the counter) and each relative position of the commutator and brushes. In the table the first column indicates the number registered in the electronic counter; the second to fifth columns inclusive indicate which of the leads A1 or A2, B1 or B2, C1 or C2, D1 or D2 is energized, i.e. is positive with respect to the other. The commutator in each position connects four of the eight leads, one from each pair, to the amplifier. The resulting voltage, depending upon the number of connected and energized leads, varies from four units (when all the connected leads are energized) to zero units (when none are energized). The intermediate voltage levels are one unit, two units, and three units depending upon whether one, two, or three of the connected leads are positive. The control may be arranged to operate when all the connected leads are positive or all negative.

These voltage levels are indicated in columns 6 to 15 inclusive for each position of the commutator for each number that may be registered in the counter. It should be noted that the voltage level rises and falls by unit steps and reaches four units (to stop the indicator) only once in each revolution.

Table

| No. in Counter | Leads Energized | | | | Voltage to Amplifier in Units at each Commutator Position | | | | | | | | | |
|---|---|---|---|---|---|---|---|---|---|---|---|---|---|---|
| | A | B | C | D | 0 | 8 | 9 | 1 | 5 | 7 | 3 | 2 | 6 | 4 |
| 0 | 2 | 2 | 2 | 2 | 4 | 3 | 2 | 3 | 2 | 1 | 2 | 3 | 2 | 3 |
| 1 | 1 | 2 | 2 | 2 | 3 | 2 | 3 | 4 | 3 | 2 | 3 | 2 | 1 | 2 |
| 2 | 2 | 1 | 2 | 2 | 3 | 2 | 1 | 2 | 3 | 2 | 3 | 4 | 3 | 2 |
| 3 | 1 | 1 | 2 | 2 | 2 | 1 | 2 | 3 | 2 | 3 | 4 | 3 | 2 | 1 |
| 4 | 2 | 2 | 1 | 2 | 3 | 2 | 1 | 2 | 3 | 2 | 1 | 2 | 3 | 4 |
| 5 | 1 | 2 | 1 | 2 | 2 | 1 | 2 | 3 | 4 | 3 | 2 | 1 | 2 | 3 |
| 6 | 2 | 1 | 1 | 2 | 2 | 1 | 0 | 1 | 2 | 3 | 2 | 1 | 3 | 2 |
| 7 | 1 | 1 | 1 | 2 | 1 | 0 | 1 | 2 | 3 | 4 | 3 | 2 | 3 | 2 |
| 8 | 2 | 2 | 2 | 1 | 3 | 4 | 3 | 2 | 1 | 0 | 1 | 2 | 1 | 2 |
| 9 | 1 | 2 | 2 | 1 | 2 | 3 | 4 | 3 | 2 | 1 | 2 | 1 | 0 | 1 |

A second form of commutator suitable for use in the display device is illustrated in Figure V. In the commutator first described the brushes are mounted on the moving part of the indicating device and the conducting segments of the commutator are mounted on the stationary member. This leads to certain difficulties in construction. It is sometimes desirable to use a second form in which a set of nine brushes mounted on the stationary part of the equipment cooperate with a single conducting member having its parts arranged in a certain pattern and carried on the moving part of the device. In this latter form of the invention a set of nine brushes, one for each of the leads A1, A2, B1, B2, etc. and one for the output lead 4 going to the amplifier 5, are provided.

Referring to Figure V, a commutator member 150 that may be mounted in a rotating part of an indicating drum such as the drum 12 is provided with a conducting surface 151 and insulated surfaces 152. A series of brushes 153–161 are arranged to cooperate with the commutator 150. The brush 153 always contacting the conducting surface 151 is connected to an output lead such as the lead 4 shown in Figure I. The brushes 154 to 161 are connected two to each stage of the counter. In the particular arrangement the connections are: brush 154—lead C2 of stage C; brush 155—lead A2 of stage A; brush 156—lead B1 of stage B; brush 157—lead C1 of stage C; brush 158—lead A1 of stage A; brush 159—lead D2 of stage D; brush 160—lead B2 of stage B; and brush 161—lead D1 of stage D.

The commutator 150 is shown relative to the brushes in the position it occupies to indicate a zero. In such a position the brushes 156, 157, 158 and 161 bear on insulated portions while the remaining brushes 154, 155, 159 and 160 bear on conducting portions which are electrically connected to the portion cooperating with the brush 153 which is the output brush connected to the lead 4.

As the commutator moves one step counterclockwise from the position shown the brush 159 passes from the conducting portion to the insulated portion while the brush 161 passes from the insulated to the conducting portions. These two brushes are connected to the fourth or D stage of the electronic counter and represent a change of eight in the count.

Proceeding clockwise in the figure (counterclockwise movement of the commutator relative to the brushes) to the following positions that are reached as the commutator continues to rotate counterclockwise one finds that in passing to the second position from the zero, the nine position, that brush 158 passes from an insulated to a conducting segment while brush 155 passes from a conducting to an insulated portion. The same continues for the succeeding steps. In transferring from each step to the next, one brush of each pair passes from an insulated to a conducting portion while the other brush of the pair passes from a conducting to an insulated segment. In this arrangement for any possible position of the commutator with respect to the brushes four of the brushes bear on insulated portions of the commutator while the remaining four brushes bear on conducting portions. By the pattern of the insulated portions in respect to the conducting portions these combinations are varied to correspond to the combinations of conducting states in the electronic counter representing each of the digits 0 to 9 inclusive.

One advantage of the particular arrangement shown in Figure V is that all of the conducting segments may, without interconnecting leads, be electrically connected. Thus this commutator may be easily manufactured by any of the stamping or printing processes.

Another advantage of this particular arrangement is that only one set or pair of brushes transfer from an insulated to a conducting portion with each step in the revolution of the commutator. Thus as the commutator approaches a position corresponding to the count in the counter the voltage on the output lead 4 rises stepwise from one voltage level to the next as it approaches the final position. This arrangement avoids the production of large transient voltages which may interfere with the operation of the counter.

Various modifications in particular details of construction may be made without departing from the scope of the claims.

Having described the invention, we claim:

1. In a device for positioning an indicia bearing member according to the count registered in an electronic counter, in combination, a multistage electronic counter, a frame member, an indicia bearing rotary member journaled on the frame member, switching means carried on the members, a pair of leads for each stage of the counter connected to points of the counter that alternately have a distinctive potential according to the count registered in the counter, an impedance connected in series with each lead, an output lead, said switching means being arranged to interconnect selected ones from each pair of leads and the output lead whereby the potential of the output lead approximates the average of the distinctive potentials of the counter points then interconnected through said leads, means for rotating the rotary member, and means connected to said output lead for stopping the rotary member when the potential of the output lead approximates the distinctive potential of a counter stage.

2. A device according to claim 1 in which the switching means comprises a commutator and cooperating brushes.

3. A device according to claim 2 in which the commutator is mounted on the rotary member and has interconnected conductive surfaces and the brushes are mounted on the frame and are connected through the impedances to the distinctive potential points of the counter stages.

4. A device according to claim 2 in which the brushes are mounted on the rotating member and are permanently interconnected, and in which the commutator is mounted on the frame member and has conductive surfaces cooperating with the brushes, there being a conductive surface for each lead including the output lead.

5. A device according to claim 1 in which the switching means is arranged so that the average potential on the output lead rises or falls by unit steps as the rotary member is rotated relative to the frame member.

References Cited in the file of this patent
UNITED STATES PATENTS

| | | |
|---|---|---|
| 1,933,650 | Bascom | Nov. 7, 1933 |
| 2,476,673 | May et al. | July 19, 1949 |
| 2,481,780 | Preston | Sept. 13, 1949 |
| 2,533,242 | Gridley | Dec. 12, 1950 |
| 2,591,555 | Klopf | Apr. 1, 1952 |
| 2,630,552 | Johnson | May 3, 1953 |
| 2,697,551 | Rench | Dec. 21, 1954 |
| 2,727,222 | Bush | Dec. 13, 1955 |
| 2,736,016 | Marlowe | Feb. 21, 1956 |